United States Patent [19]

Primavera

[11] Patent Number: 4,570,377
[45] Date of Patent: Feb. 18, 1986

[54] TAMPER-PROOF BAITING DEVICE FOR RODENTS AND THE LIKE

[76] Inventor: Russell R. Primavera, 5127 Alcott St., Denver, Colo. 80221

[21] Appl. No.: 638,235

[22] Filed: Aug. 6, 1984

[51] Int. Cl.³ .............................................. A01M 1/20
[52] U.S. Cl. ..................................................... 43/131
[58] Field of Search ................................... 43/131, 124

[56] References Cited

U.S. PATENT DOCUMENTS

| | | | |
|---|---|---|---|
| 993,887 | 5/1911 | Schroeder | 43/131 |
| 2,532,681 | 12/1950 | Stover | 43/131 |
| 2,944,364 | 7/1960 | Kelly | 43/131 |
| 2,964,871 | 12/1960 | Hoffman | 43/131 |
| 4,182,070 | 1/1980 | Connelly | 43/131 |
| 4,228,613 | 10/1980 | Kalnasy et al. | 43/131 |
| 4,349,982 | 9/1982 | Sherman | 43/131 |
| 4,364,194 | 12/1982 | Clark | 43/131 |
| 4,400,904 | 8/1983 | Baker | 43/131 |

FOREIGN PATENT DOCUMENTS 48211 11/1982 Sweden ................................ 43/131

*Primary Examiner*—Gene P. Crosby
*Attorney, Agent, or Firm*—Fields, Lewis, Pittenger & Post

[57] ABSTRACT

A tamper-proof baiting device (11) includes a rigid housing (12) adapted to open and close, a spillproof feed hopper (13) in the housing and readily removable therefrom, and a tubular member (14) extending through the housing forming a passageway into the housing for a rodent as well as locking the housing in the closed position until access by other than children is required.

15 Claims, 9 Drawing Figures

U.S. Patent Feb. 18, 1986 Sheet 1 of 3 4,570,377
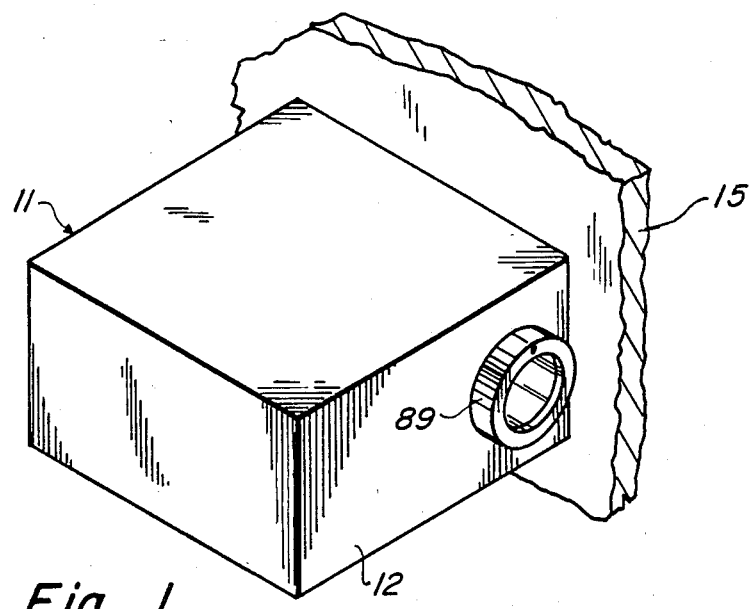
Fig_1
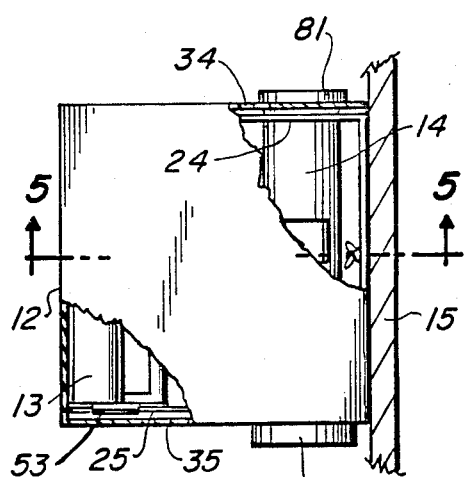
Fig_2
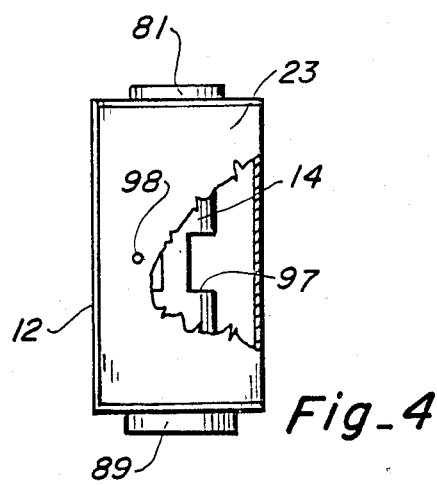
Fig_4
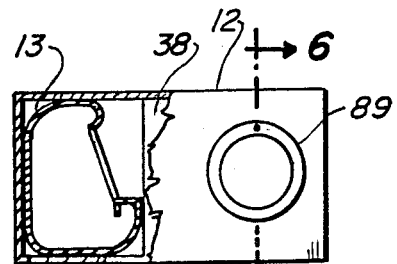
Fig_3
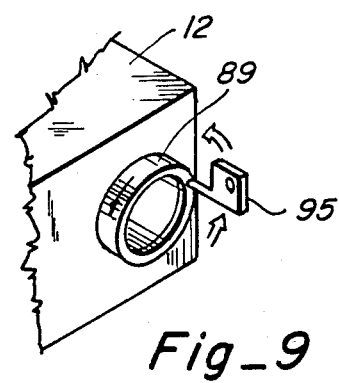
Fig_9

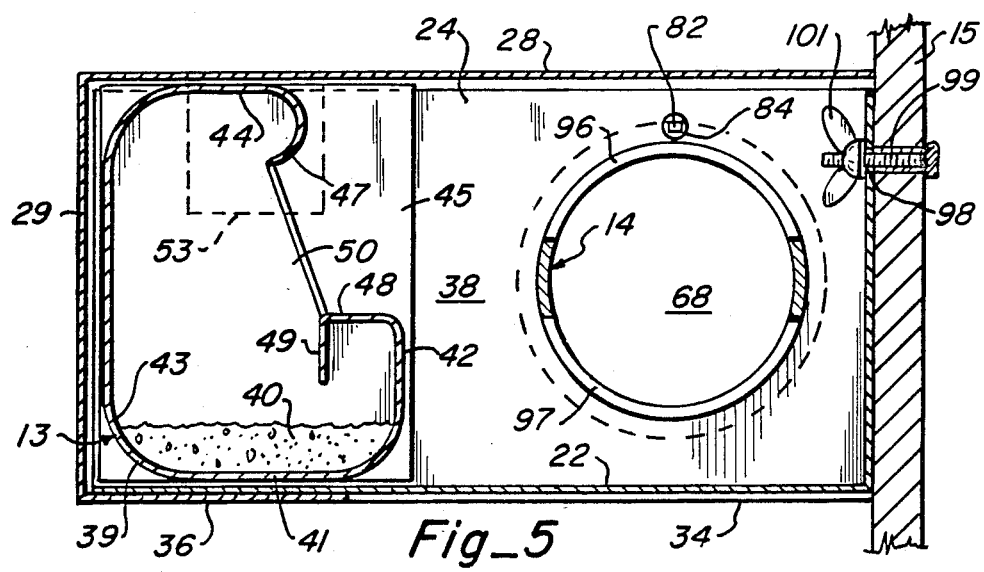
Fig_5
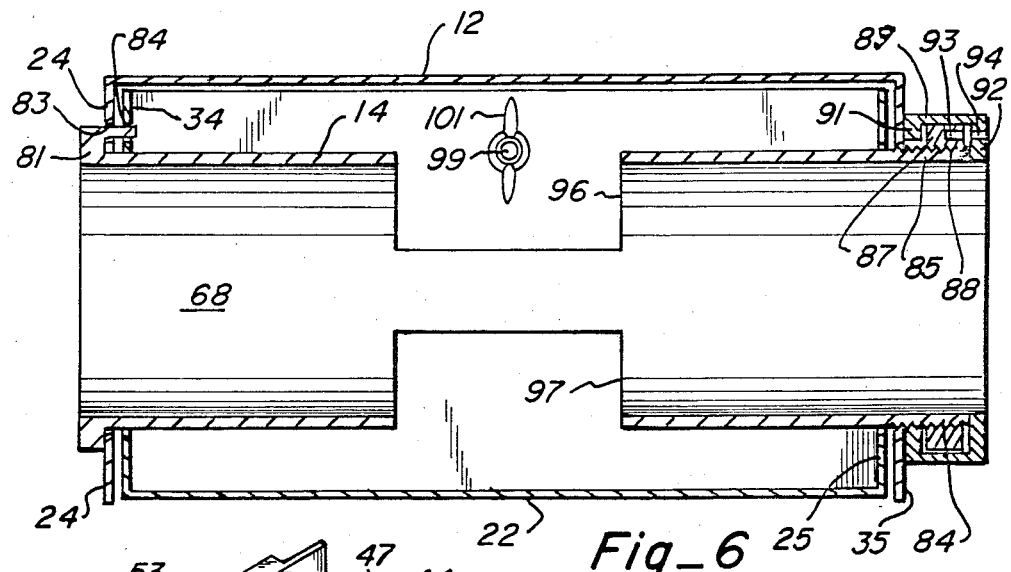
Fig_6
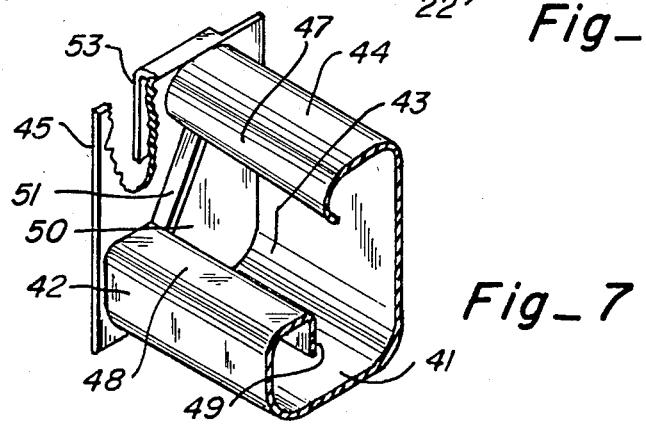
Fig_7

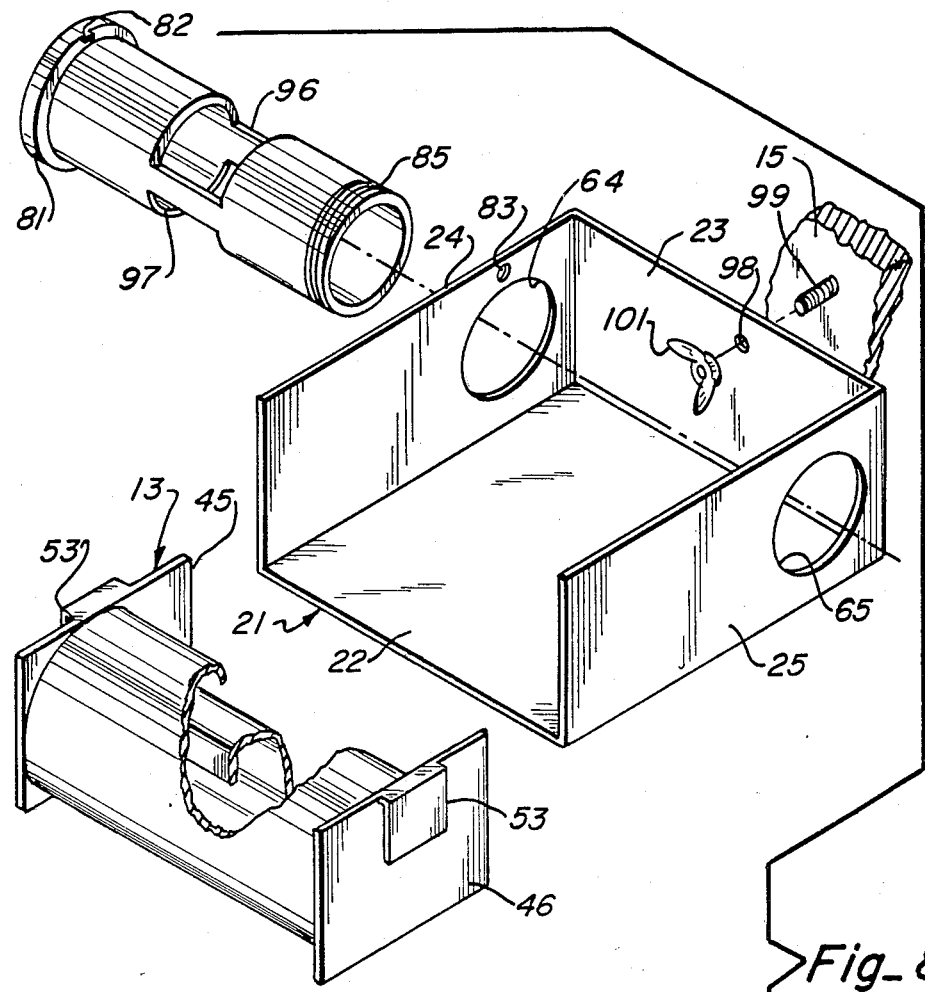
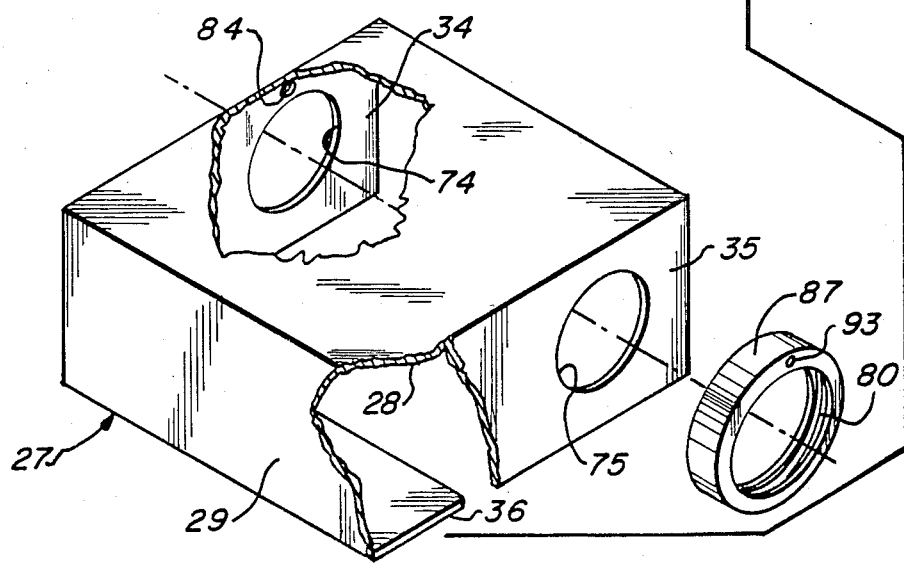
Fig. 8

TAMPER-PROOF BAITING DEVICE FOR RODENTS AND THE LIKE

TECHNICAL FIELD

This invention relates to a novel and improved baiting device for delivering a poisonous feed to rodents and the like that is particularly safe for use around children.

BACKGROUND ART

A number of different types of rodent bait stations have heretofore been provided. These have not been entirely satisfactory for all applications because of the problems of durability, spillage, and tampering by children. Examples of prior art tamper-proof rodent bait stations that are concerned with avoiding spillage are in U.S. Pat. Nos. 4,182,070, Connelly; 4,228,613, Kalnasy et al.; 4,349,982, Sherman, and 4,400,904, Baker.

Sherman discloses a box with annular entrance openings into a feeding chamber having internal baffles to inhibit spillage.

Kalnasy et al. has a hinged lid on a bait box with internal baffles to isolate the bait.

Connelly has a two-part box with an internal swinging door to isolate the bait.

Baker has an H-shaped enclosure with internal baffles together with a bait-containing tubular member adapted to be locked.

DISCLOSURE OF INVENTION

In accordance with the present invention there is provided a tamper-proof baiting device comprised of a two-piece housing with the pieces being separable from one another to permit access to the inside to service a spill-proof feed hopper contained therein. A tubular member slidably extends through the housing having end locking means so that it is not removable by children. The tubular member serves the dual function of locking the housing closed and providing an access for the rodent into the housing to the feed hopper.

BRIEF DESCRIPTION OF DRAWINGS

The details of this invention will be described in connection with the accompanying drawings, in which:

FIG. 1 is a perspective view of a tamperproof rodent baiting device shown mounted to an upright support wall;

FIG. 2 is a top plan view of the device shown in FIG. 1 with outer wall portions broken away to show interior construction;

FIG. 3 is a side elevation view of the device shown in FIGS. 1 and 2 with outer wall portions broken away to show interior construction;

FIG. 4 is a rear end elevation view of the device shown in FIG. 2 with outer wall portions broken away to show interior construction;

FIG. 5 is a sectional view taken along lines 5—5 of FIG. 2;

FIG. 6 is a sectional view taken along lines 6—6 of FIG. 3;

FIG. 7 is a front perspective view of one end of the feed hopper;

FIG. 8 is an exploded view of the device shown in FIGS. 1-7; and

FIG. 9 is a perspective view showing the key in place in the tubular member as an initial step in removing the tubular member from the housing.

DETAILED DESCRIPTION

Referring now to the drawings, the baiting device 11 shown generally comprises a housing 12, a feed hopper 13 in the housing, and an entrance and locking tubular member 14 extending through the housing. The device 11 is shown rigidly mounted to an upright support wall 15.

The housing 12 is of a two-piece construction comprised of a bottom section 21 and a top section 27. The bottom section has a bottom wall 22, an end wall 23, and opposed, parallelly spaced sidewalls 24 and 25 extending up from the bottom wall. The top section 27 has a top wall 28, an end wall 29, and opposed, parallelly spaced sidewalls 34 and 35 extending down from the top wall, together with a cut-off bottom wall 36 of limited extent extending in from the end wall 29.

The bottom and top sections 21 and 27 are rigid and preferably made of a sheet metal to provide a rigid, durable, weather-resistant housing. These bottom and top sections are easily separable from one another to permit access to and removal of the feed hopper 13 as required. As best seen in FIG. 6, the sidewalls of the interfitting housing sections form a pair of contiguous sidewalls 24 and 34 which are spaced from a pair of contiguous sidewalls 25 and 35. In the assembly the top section fits down over the bottom section and the bottom wall 36 slides under bottom wall 22 to form a substantially enclosed inner chamber 38. It is understood that a two-piece housing construction with a top section having depending flanges and a bottom open-topped box using hinges located at the top of one end could be used to form a closed housing and permit access into the inside.

The feed hopper 13 shown has a trough-like or channel-shaped lower bin portion 39 which contains the feed, indicated at 40. Bin portion 39 includes a bottom wall 41 and opposed sidewalls 42 and 43 extending up from opposite edges of the bottom wall. An upper overhanging wall 44 extends over the bin portion and has a flange portion 47 that turns down and back. The forward sidewall has a lower overhanging wall portion 48 that turns back and down at an angle and has a downturned terminal lip section 49. Rectangularly shaped end walls 45 and 46 close the ends of the hopper and are larger than the transverse cross section thereof to project beyond the extremities of the bin portion. The hopper 13 is symmetrical in relation to a transverse center line so that a description of one end also applies to the other end.

The feed hopper 13 further has an end strip 51 of limited width that extends only at the ends between flange portions 47 and 48 to define the ends of a side fill opening 50 that faces toward the tubular member 14. Thus the fill opening 50 is formed between flanges 47 and 48 and end strips 51, is of rectangular shape, and is generally on an incline to the top and upright sidewalls. This construction and incline in the opening with overhanging wall portions for the hopper permit it, if crushed, to close up around the feed to further prevent any possible spillage.

A clip 53 extends out and down from the top of each end wall 45 and 46. In the assembly the clip 53 fits over the adjacent end wall of the bottom section 21 and the top section fits over the clip 53, as best seen in FIG. 7.

This firmly holds the hopper in place and yet allows it to be removed from the housing once the two housing sections have been separated.

In a preferred construction the lower bin portion 39 of the hopper is waterproofed by a coating or the like to prevent the feed from becoming moist during use. This waterproofing preferably extends to the top of the shorter sidewall 42.

The tubular member 14 slidably extends through tube opening 64 in wall 24, tube opening 65 in wall 25, tube opening 74 in wall 34, and tube opening 75 in wall 35 and serves to hold the sections together. The openings in the wall housing are above the bottom wall to locate the tube above the bottom of the housing to further prevent the possibility of feed escaping from the housing. The tubular member is spaced from and generally parallel to the hopper 13. This tubular member defines an interior passageway 68 for a rodent or the like that is open at both ends. In a preferred construction the tubular member 14 is a rigid PVC tube of a circular cross section and the tube openings are of a complementary shape and only slightly larger in diameter to provide a close slide fit.

An enlarged end portion or head 81 is affixed to one end of the tubular member that is larger in diameter than opening 64 to limit the extent of movement of the tubular member in relation to the housing. The head has a pin 82 that inserts into alined holes 83 and 84 in sidewalls 24 and 34, respectively, to hold the tubular member 24 against rotation relative to the housing.

The tubular member has an externally threaded end portion 85 opposite head 81. A removable sleeve 87 having internal threads 88 threads on threaded end portion 85. Sleeve 87 is of a larger diameter than opening 75 and holds the tube against removal from the housing.

The tamper-proof feature includes an outer sleeve 89 with radially inwardly extending axial end flanges 91 and 92 that fits over, embraces, and is freely rotatable around sleeve 87 so that sleeve 87 cannot normally be unthreaded from the tubular member. The sleeves 87 and 89 have alined apertures 93 and 94, respectively, in which a key 95 is inserted, whereby the rotation of the outer sleeve causes the inner sleeve to rotate. It is understood that other tamper-proof arrangements such as those used for medicine bottles could be utilized in place of the preferred arrangement shown.

The tubular member 14 shown has an upper arcuate opening or cut-out 96 that is less than a span of 180° and a lower arcuate cut-out or opening 97 opposite cut-out 96. These cut-outs are intermediate the ends of the tubular member and allow the rodent to enter either open end of the tubular member, pass through either of the slots 96 or 97 into the inner chamber, and then pass through the opening 50 in the feed hopper to eat the feed 40. The lower opening 97 further enables any feed carried by the animal into the tube and dropped to pass back into the housing 12.

A hole 98 is provided in the back wall 23 through which a bolt 99 extends from the supporting wall 15 and a lock nut 101 is shown inside the housing to hold the device on the wall. This mounting arrangement is accessible only by removing the entrance tubular member and opening the housing.

Although the present invention has been described with a certain degree of particularity, it is understood that the present disclosure has been made by way of example and that changes in details of structure may be made without departing from the spirit thereof.

What is claimed is:

1. A tamper-proof baiting device for delivering a poisonous feed to a rodent and the like without spillage of the feed comprising:
   a housing including first and second sections interfitting in a closed position and adapted to be moved to an open position when unlocked;
   a hopper in said housing in which a poisonous feed is contained, said hopper having a trough-like bin portion for holding the feed, said bin portion having opposed overhanging wall portions extending beyond said trough-like portion from opposite sidewalls to prevent said feed from spilling; and
   a tubular entrance member extending through tube openings in said sections so as to hold said sections in the closed position, said tubular member having locking means for preventing it from being removed from said housing by children and the like and operable to permit said tubular member to be slidably removed from said housing and said sections to the open position to permit access to said hopper.
   said tubular member having at least one end open and having at least one intermediate opening between the ends of the tubular member disposed within said housing forming a passageway to permit the entry of a rodent into and exit from said housing.

2. A device as set forth in claim 1 wherein said first section includes a bottom wall, an end wall, and opposed sidewalls extending up from the bottom wall and said second section includes a top wall, an end wall, opposed sidewalls extending down from the top wall, and a bottom wall of limited extent extending in from said end wall, said second section fitting down over said first section.

3. A device as set forth in claim 1 wherein said bin portion has a bottom wall, opposed sidewalls extending up from the bottom wall, an upper overhanging wall portion extending over the bin portion, and a lower overhanging wall extending over said bin portion, there being a side fill opening to said bin portion between said overhanging wall portions.

4. A device as set forth in claim 3 wherein said upper overhanging wall portion has a downturned lip and said lower overhanging wall portion has a downturned lip.

5. A device as set forth in claim 3(wherein said overhanging wall portions fold over and close said feed opening when crushing forces are applied thereto.

6. A device as set forth in claim 1 wherein said bin portion is waterproofed.

7. A device as set forth in claim 1 wherein said hopper is removably secured at the ends to said housing.

8. A device as set forth in claim 1 wherein said tubular member has a rigid end member larger than the tube opening in the housing and a removable end member at the opposite end larger than the tube opening normally holding the tubular member against removal from said housing.

9. A device as set forth in claim 1 wherein said removable end member includes an inner sleeve threaded on said tubular member and an outer sleeve with internal flanges embracing and rotatable around said inner sleeve normally to prevent said inner sleeve from being turned, and key means to hold said members for conjoint rotation to remove said inner sleeve from said tubular member.

10. A device as set forth in claim 1 including means to mount the housing to an upright wall.

11. A device as set forth in claim 10 wherein said means to mount the housing include a threaded bolt projecting beyond the upright wall through a hole in the housing with a nut threaded on the bolt.

12. A device as set forth in claim 1 wherein said intermediate opening is comprised of an upper arcuate cut-out in the upper half of the tubular member that is less than a span of 180 degrees and a lower arcuate cut-out opposite the upper arcuate cut-out that is less than a span of 180 degrees.

13. A device as set forth in claim 1 wherein said feed hopper has fastening means at each end to releasably secure the ends of said hopper to said housing.

14. A device as set forth in claim 13 wherein said feed hopper has rectangular end walls and said fastening means includes a clip extending from said end walls to clip to one of said interfitting housing sections and be covered by the other of said housing sections.

15. A tamper-proof baiting device for delivering a poisonous feed to a rodent and the like without spillage of the feed comprising:
- a housing including first and second sections made of a rigid sheet material interfitting with one another in a closed position to form an inner chamber, said sections being separable from one another to an open position when unlocked to permit access into said chamber, said sections having pairs of contiguous walls spaced from one another;
- a spill-proof feed hopper in said inner chamber in which a poisonous feed is contained, said hopper having a trough-like bin portion and spaced upper and lower overhanging wall portions above said trough-like portion, said overhanging wall portions extending from opposite sidewalls to prevent said feed from spilling from said chamber; and
- a tubular member slidably extending through alined openings in said pairs of contiguous walls, said tubular member being spaced from and generally parallel to said feed hopper, said tubular member having end locking means holding it from being removed from said housing to prevent said sections from being separated by children and the like, said locking means including an enlarged end portion removable from said tubular member by other than children to enable said tubular member to be slidably removed from said housing to permit access into said inner chamber,
- said tubular member being open at both ends and having an opening between the ends extending into the housing forming a passageway into said chamber to permit the entry of a rodent into and exit from said inner chamber.

* * * * *